Figure 1:
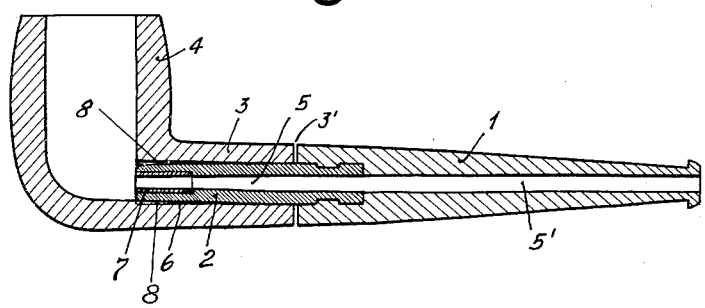

June 13, 1961  A. STUDER  2,988,090

PIPE FOR TOBACCO

Filed Jan. 14, 1958

INVENTOR
*Albert Studer*

BY *Lowry & Rinehart*

ATTORNEYS

United States Patent Office 2,988,090
Patented June 13, 1961

2,988,090
PIPE FOR TOBACCO
Albert Studer, Finsterwald, Switzerland
Filed Jan. 14, 1958, Ser. No. 708,829
2 Claims. (Cl. 131—219)

In the pipes for tobacco which have become known in the past, the insert tube which is fixed to the mouthpiece and engages in the stem of the pipe bowl is generally made of metal. The inner end of the insert tube is in the neighbourhood of the burning tobacco, and therefore becomes comparatively hot. Owing to the high conductivity of the metal, the entire length of the insert becomes hot, and the heating of the adjacent parts is unavoidable. The temperature of the insert tube is raised during smoking and the material expands due to the effect of the heat, and since the coefficients of expansion of the metal insert tube and of the wooden adjacent parts are different, the tube will either become fixed during smoking, or become too loose when the pipe is not in use. Experience has shown that it is difficult to correctly dimension the insert tube and the adjacent elements by which it is supported in the connection of the pipe bowl. It is therefore the usual practice to employ a sealing washer, normally made of cork, placed between the contact sides of the pipe stem and of the mouthpiece. The insert part is made of a hard material, so that it is not possible to change the position of the pipe bowl with respect to the mouthpiece. Strong lateral pressures acting on the mouthpiece or on the pipe bowl may damage the pipe, owing to the fact that the insert tube does not yield, and this damage is caused particularly near the faces where the tube makes contact with the mouthpiece and the pipe bowl stem.

The object of the present invention is to provide a pipe for tobacco, in which the foregoing disadvantages are removed in a simple and effective manner. According to the invention, this is achieved by making the insert tube of a deformable material, which insulates against heat, in order to prevent the condensation of water during smoking, and which also exerts an elastic clamping pressure in its cold and hot condition on the walls in which it is supported, in order to achieve a uniform sealing effect, and which is also bendable in its longitudinal direction, in order to enable the position of the pipe bowl with respect to the mouthpiece to be changed, while the end of the insert tube facing the pipe bowl is equipped with a fire-proof anti-corrosion coating, in order to maintain the original width of the orifice of the smoke duct.

Figure 2:
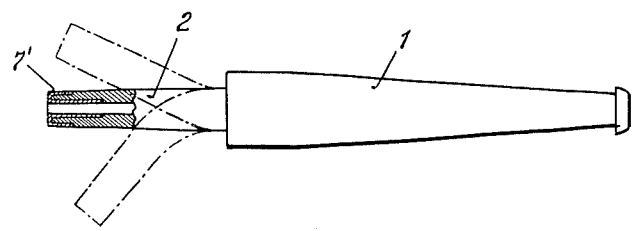

The drawing shows examples of embodiments of the invention, in which:

FIG. 1 is a longitudinal section through a pipe according to the instant invention, and FIG. 2 is a side elevational view partly in section of the mouthpiece for the pipe and a modified form of insert tube.

The pipe for tobacco here shown has a mouthpiece 1 with a smoke passage 5' therein and in which passage 5' an insert tube 2 is fixed and which tube is detachably engaged with the stem 3 of the pipe bowl 4. The insert tube 2 is made of elastic flexible material, capable of assuming and maintaining differently bent positions and the heat conductivity thereof is extremely small, the material employed in the manufacture of this insert tube 2 preferably being comprised of semi-plastic polyamides, for instance, "Grilon." The insert tube 2 is tapered at the end thereof which enters into the opening or bore of the stem 3 of the pipe bowl 4 and is also made with a smoke duct 5 forming communication between the mouthpiece 1 and pipe bowl 4 and is tapered towards the inner end adjacent the pipe bowl 4. The mouthpiece 1 with the insert tube 2 carried thereby has the tube placed in the bore 6 in the pipe stem 3 for intimate contact with the bore over its major length except for a relatively short tapered bore portion 8 as illustrated in FIG. 1. Due to the elastic nature of the insert tube 2, there is sufficient frictional connection of the parts to prevent twisting or separation thereof. The end of the tube 2 which makes contact with the burning tobacco in the pipe bowl is protected against deformation due to the effects of the heat or burning, and the resulting changes of the inlet opening of the duct 5, by a fire-proof and corrosion-proof metal or ceramic bushing 7. The end of the tube 2 can also be reinforced, as shown in FIG. 2, by a metal sleeve, or a ceramic section 7', which lines the end of the tube inside and outside. At the end of the tube near the pipe bowl, an intermediate space 8, tapering towards the pipe bowl, is arranged between the inserting tube 2 and the bore 6 of the stem 3. This space is employed to collect the water of condensation from the smoke, which forms inside the pipe bowl.

The insert tube 2 at its most fragile part is flexible and resistant to fracture, when acted upon by lateral forces, as shown by the dotted line in FIG. 2. The flexibility of the insert tube 2 enables also the insert tube to be deformed, and the pipe bowl to be pushed on the deformed tube, which enables the smoker to bend the pipe into the right shape, for instance, when he is smoking in a lying position, and afterwards bend it back again. It will be understood that the mouthpiece 1 and insert tube 2 must be partially removed from the stem 3 of the pipe or entirely removed therefrom, as shown in FIG. 2, to effect bending or deforming of the insert tube to the desired semi-permanent angle relative to the pipe stem. With the mouthpiece and insert tube partially removed from the pipe stem 3 and with the insert tube deformed to an angle such as illustrated in FIG. 2, the bushing 7 holds the inner end of the insert tube rigid to prevent collapse of the tube and to maintain the normal diameter of the bore or smoke duct 5 of the insert tube constant. If the insert tube is bent to a considerable extent with respect to the mouthpiece, the stem 3 at some distance from the mouthpiece i.e. the space 3' in FIG. 1 can be made wider.

Due to the use of an elastic flexible insert tube made of a heat-insulating plastic, the tobacco pipe has become almost indestructible at just that point which hitherto was its most sensitive part. A further advantage is the property of the insert tube of insulating against heat, so that any formation of water of condensation in the pipe tube is greatly reduced.

While the invention has been described in details with respect to now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A pipe including a bowl and a lower laterally projecting stem having a substantially uniform longitudinal bore opening into a lower portion of said bowl, a mouthpiece including a tubular longitudinal end portion removably received in the bore of said stem adjacent the lower portion of said bowl, said tubular longitudinal end portion comprising a deformable member bendable into permanent angular relation about its longitudinal axis to a one of a plurality of permanent angular positions with respect to the longitudinal bore of said bowl stem upon partial withdrawal of the end portion of the mouthpiece from said bore to permit the bowl to be disposed in angular relation to the longitudinal axis of the mouthpiece during use.

2. The structure of claim 1; and a fireproof, non-corrodible tubular insert of a relatively rigid material axially disposed in the tubular portion of said stem for maintaining the cross-sectional dimension of the portion of said tubular mouthpiece portion to insure a tight fit in said bowl stem, said tubular insert maintaining the tubular portion substantially rigid at the portion received in said bowl stem when the tubular portion is bent into a permanent angular relation with respect to said bowl stem.

References Cited in the file of this patent

UNITED STATES PATENTS

| | | |
|---|---|---|
| 61,283 | Truman | Jan. 15, 1867 |
| 266,582 | De Muth | Oct. 24, 1882 |
| 2,317,180 | Daignault et al. | Apr. 20, 1943 |
| 2,373,296 | Donnelly | Apr. 10, 1945 |
| 2,421,338 | Lavietes | May 27, 1947 |
| 2,443,108 | Lavietes | June 8, 1948 |
| 2,613,675 | Darbee | Oct. 14, 1952 |

FOREIGN PATENTS

| | | |
|---|---|---|
| 6,706 | Great Britain | 1895 |
| 924,147 | France | Mar. 3, 1947 |